United States Patent
Cui et al.

(10) Patent No.: US 9,727,319 B1
(45) Date of Patent: *Aug. 8, 2017

(54) REDUCING COMPILATION TIME USING PROFILE-DIRECTED FEEDBACK

(71) Applicant: International Business Machines Corporation, Armonk, NY (US)

(72) Inventors: Shimin Cui, Toronto (CA); William G. O'Farrell, Markham (CA); Graham K. Yiu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,638

(22) Filed: Oct. 13, 2016

Related U.S. Application Data

(63) Continuation of application No. 15/014,330, filed on Feb. 3, 2016, now Pat. No. 9,535,673.

(51) Int. Cl.
*G06F 9/45* (2006.01)
(52) U.S. Cl.
CPC .................. *G06F 8/4441* (2013.01)
(58) Field of Classification Search
CPC ..... G06F 8/4441; G06F 8/443; G06F 11/3466
USPC ......................... 717/153, 154, 158
See application file for complete search history.

(56) References Cited

U.S. PATENT DOCUMENTS

| 8,387,026 | B1 | 2/2013 | Hundt et al. | |
|---|---|---|---|---|
| 8,806,463 | B1* | 8/2014 | Li | G06F 8/443 717/151 |
| 9,015,684 | B1 | 4/2015 | Koh et al. | |
| 2011/0016460 | A1* | 1/2011 | Archambault | G06F 8/4442 717/158 |
| 2014/0298307 | A1* | 10/2014 | Johnson | G06F 8/443 717/158 |

OTHER PUBLICATIONS

U.S. Appl. No. 15/014,330, "Reducing Compilation Time Using Profile-Directed Feedback", filed Feb. 3, 2016, 22 pages.
IBM Appendix P.: "List of IBM Patents or Patent Applications to be Treated as Related", Dated Oct. 13, 2016, 2 pages.

* cited by examiner

*Primary Examiner* — Anna Deng
(74) *Attorney, Agent, or Firm* — Stephen R. Yoder

(57) ABSTRACT

A method for significantly reducing compilation time of an application program is provided for compiling the program using profile-directed feedback (PDF). The method applies an additional analysis process between a training run of the application program and a whole program compilation of the application. This analysis process examines a PDF profile file(s) produced during the training run and aggregates data from the PDF file to determine a maximum block counter associated with each source file of the application. Only those source files having maximum block counters in a specified top percent of all the source files of the application have their fat binaries included in the whole program compilation.

20 Claims, 4 Drawing Sheets

REDUCING COMPILATION TIME USING PROFILE-DIRECTED FEEDBACK

BACKGROUND

The present invention relates generally to the field of computer software, and more particularly to program compilation.

Generally, a computer program is written in a high level computer language, such as C or FORTRAN. Such computer program is required to be complied into a machine language that can be executed by a computer. Compiling allows a computer to run and understand the program without the need of the programing language used to create it. Program compilation involves many or all of the following operations: lexical analysis, preprocessing, parsing, semantic analysis (syntax-directed translation), code generation, and code optimization.

Among many compilation techniques, profile-directed feedback (PDF) is a compiler optimization technique in computer programming that uses profiling to improve program runtime performance. PDF is a two-stage compilation process that provides a compiler with data characteristic of typical program behavior. An instrumented executable is first run in a number of different scenarios for an arbitrary amount of time, producing a profile data file. A second compilation using the profile data file then produces an optimized executable.

SUMMARY

In one aspect of the present invention, a method is provided comprising: executing training executable code using training data, the training executable code being generated from code portions of an application program, the training executable code including a block counter and a call counter; updating the block counter and the call counter during execution of the training executable code according to the number of times one code portion of the code portions is executed during a training run; storing the updated block counter and the updated call counter as profile-directed feedback information associated with the training executable code; performing an analysis on the profile-directed feedback information to produce analyzed information, at least by aggregating data of the profile-directed feedback information to determine a maximum block count associated with the one code portion; and compiling the code portions to produce compiled code output using information including the training executable code and the analyzed information, wherein the compiling includes: adding select intermediate code portions of the code portions having maximum block counts in a predetermined top percentage, the select intermediate code portions included in the training executable code when the training executable code is generated from the code portions; and substituting executable code in the training executable code for excluded intermediate code of the code portions, the excluded intermediate code being intermediate code not included in the training executable code when the training executable code is generated from the code portions.

DETAILED DESCRIPTION

Figure 1:
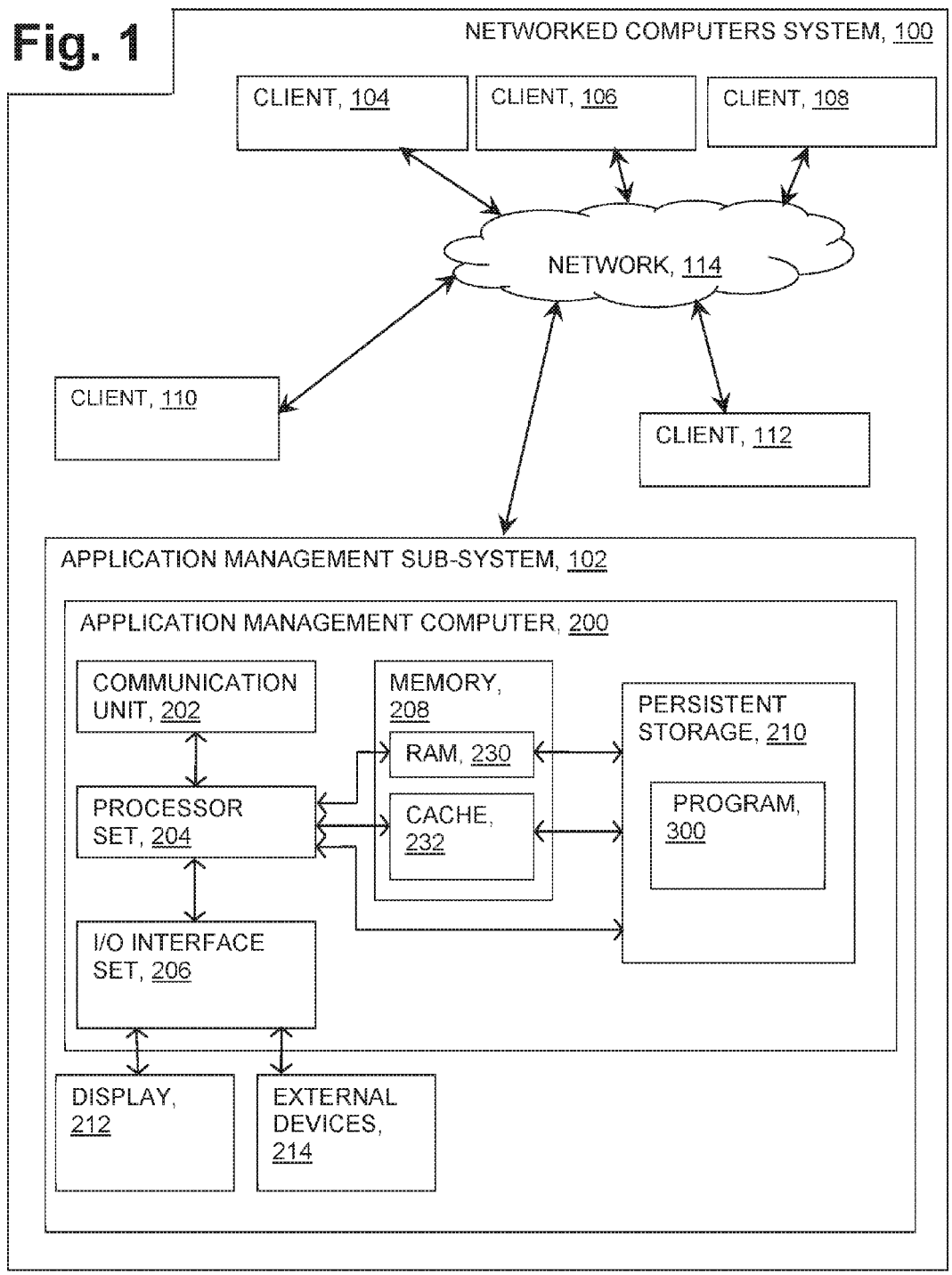
FIG. 1 is a schematic view of a first embodiment of a system according to the present invention.

A method for significantly reducing compilation time of an application program is provided for compiling the program using profile-directed feedback (PDF). The method applies an additional analysis process between a training run of the application program and a whole program compilation of the application. This analysis process examines a PDF profile file(s) produced during the training run and aggregates data from the PDF file to determine a maximum block counter associated with each source file of the application. Only those source files having maximum block counters in a specified top percent of all the source files of the application have their fat binaries included in the whole program compilation. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: application management sub-system 102; client sub-systems 104, 106, 108, 110, 112; communication network 114; application management computer 200; communication unit 202; processor set 204; input/output (I/O) interface set 206; memory device 208; persistent storage device 210; display device 212; external device set 214; random access memory (RAM) devices 230; cache memory device 232; and program 300.

Client sub-system 104, 106, 108, 110 and 112 may be a laptop computer, tablet computer, netbook computer, personal computer (PC), a desktop computer, a personal digital assistant (PDA), a smart phone, or any programmable electronic device capable of communicating with the application management sub-systems 102 via network 114.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Alternatively, a portion of program 300 may be stored in client sub-system 104, 106, 108, 110 and 112. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to insert a very fast additional analysis phase between an applications training run and a second phase compilation of the application. This analysis phase examines a profile-directed feedback (PDF) file(s) produced during the training run and aggregates the data to determine the maximum block counter associated with each source file. Additionally, program 300 may include a first phase compilation of the application and a second phase compilation of the application. In the second phase compilation, program 300 determines that only those source files having maximum block counters in the specified (or predetermined) top percentage of files have their fat binaries included in the second phase PDF whole program compilation. Further, program 300 applies aliasing information from all the source files for an additional enhancement of compilation.

Some embodiments of the present invention recognize the following facts, potential problems and/or potential areas for improvement with respect to the current state of the art: (i) although PDF-based compilation can significantly enhance performance of the compiled application program, it also greatly increase compilation time; (ii) besides the large amount of intermediate code that needs to be processed, a whole program optimization is often by its nature a highly serialized task; and/or (iii) the heavily executed portions of an application program are likely clustered together in a small number of source files.

Profile-directed feedback (PDF), also referred to as profile-based optimization (PBO), is used in static compilation for improving optimization of application programs by compiling the programs in two stages or level. In the first stage, programs are specially compiled at a lower level of optimization, and then run on a set of training data. Further, in the first stage of compilation, counters (typically block counters) and call counters are inserted to count the number of times that each particular piece of code is executed during the training run. The information regarding counters is then fed to the second phase of compilation where the information is used to guide optimization decisions. For example, hot code can be inclined and cold code can be outlined, while hot loops can be unrolled. Further this PDF approach/technique can be applied to monitor the values that variables are most likely to take on during execution, which can be used to determine, for example, which virtual functions are most likely to be called, and which can lead to better inlining decisions.

While PDF-based compilation can significantly enhance performance of the compiled program, the significant drawback is that it can greatly increase compilation time of the program. To best take advantage of the PDF information, the second phase/stage of compilation is usually a whole program optimization, referred to as inter-procedural analysis (IPA), where the entire program is analyzed for optimization opportunities. For large programs, this phase can take a long time, for example, several hours.

Specifically, for the whole program optimization, the second phase optimizer first reads all of the intermediate code in all the fat binaries that make up the application, and then matches each code block that is executed against the runtime file (PDF file) of counters that is generated during the program's training run phase. Second, the whole program/second phase optimizer is run on the code of the entire application, using the PDF counter information to guide optimization, generating optimized intermediate code. Third, the intermediate code generated from the second phase optimizer is used to generate executable binary code. This may be done by a separate optimization phase, in which case the PDF counters themselves can be added as directives to the intermediate form to further guide the optimization that occurs in the final phase.

As mentioned, this PDF-based process can produce highly optimized programs, but at the cost of very lengthy compilation times. In addition to a large amount of intermediate code that needs to be processed, the whole program optimization is usually a highly serialized task. Consequently, the PDF second phase of compiling some large commercial applications can last for hours, which is a major impediment to using PDF.

Further, large applications typically have their code spread over hundreds or thousands of source files, plus several hundred include files. Typically, in such large applications, the heavily executed portions of the application (i.e. the "hot" code) are likely organized or clustered together in a small number of source files, while many other source files have code devoted to set-up, error handling, and/or other relatively "cold" portions of code. For example, during the training run of a large application, about 97% to 98% of the application time is spent in code contained in about 10% (or less) of the source files. And those 10% of source files may contain about 15% of the code measured by lines of code. In the case of a very large commercial application, less than 8% of the source files may account for 98% of the execution time in a training run.

As such, some embodiments of the present inventions can greatly speed up the second phase compilation by limiting the number of source files that are included in PDF second phase compilation. Specifically, executable binaries (usually produced in the first phase of PDF compilation) are used to substitute for those fat binaries not included in the second phase. If executable binaries for the source files that are not included in the second phase, for some reason, are not available from the first phase of PDF compilation, such executable binaries can be produced through a highly parallelized compilation with lowered (and hence fast-to-compile) optimization. Therefore, only a fraction of the fat binaries need to be subject to the PDF-based whole program optimization.

Some embodiments of the present invention, may reduce the second phase compilation time by a factor of 5 (i.e., the second phase run five times faster), with no measurable impact on performance. That is, the time for the second phase of PDF optimization can be significantly reduced, with minimal or no impact on the performance of the compiled application while permitting nearly all of the PDF opportunities to be exploited through IPA. Such a remarkable speedup in the second phase of PDF compilation is achieved by judiciously choosing the files that are to be included. The results of the PDF training run are used to guide this choice.

Some embodiments of the present invention include aliasing information for further enhance the optimization of the second phase of PDF compilation. The aliasing information is included separately in fat binaries, and s all aliasing information can be quickly scanned and included in the whole program optimization of those files which are actually optimized.

Figure 2:
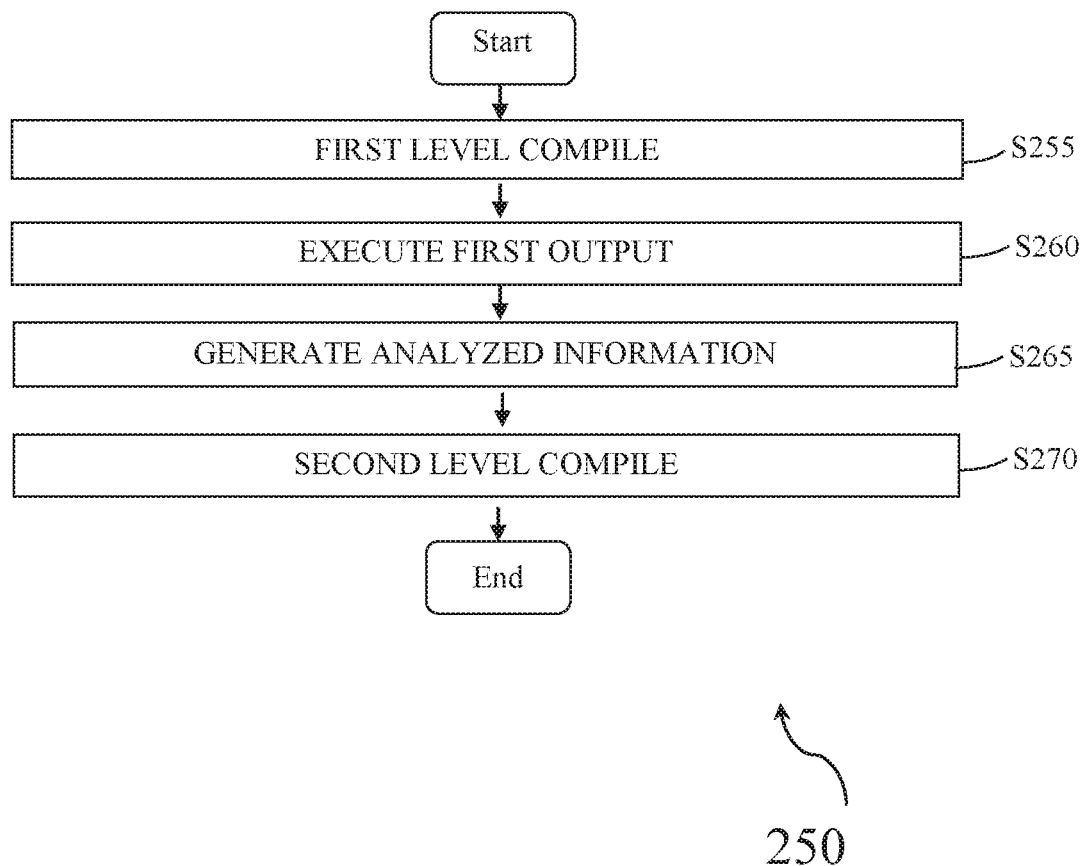
FIG. 2 is a flowchart depicting an embodiment of a method that may be performed, at least in part, by the system depicted in FIG. 1.
Figure 3:
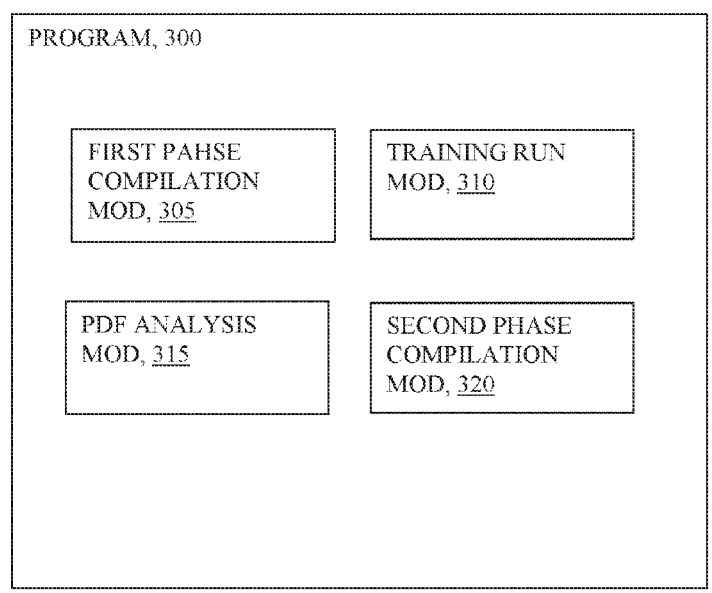
FIG. 3 is a schematic view of a machine logic (for example, software) portion of the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where first phase compilation module ("mod") 305 compile at a first level (i.e., a first phase of PDF compilation) a set of code portions of an application to produce a first output. The compiling at the first level includes inserting block counters and call counters to count a number of times one code portion of the set of code portions is executed. From the set of code portions of the application program (that is, a set for source files), the first phase of PDF compilation produces fat binaries including intermediate forms or code and executable intermediates. Herein the fat binaries are so called because they contain additional information besides the (ultimately) executable instructions. The intermediate form describes the structure of the application program and information about the data types used, and so forth, which would not be deductible from just a binary code. The first output is generated by linking all the executable intermediates, and is referred to as a training executable code. Further the training executable code includes inserted block counter and call counters.

Processing proceeds to step S260, where training run module 310 executes the first output using a set of training data. The block counters and the call counters are updated with counts of the number of times one code portion of the set of code portions is executed during a training run to create profile-directed feedback information associated with the set of code portions. After running the executable training code using a set of training data, a PDF information may be generated, for example, including as follows (notes: the PDF information may be a binary form of the profile data generated during training, but for illustrative purpose a textual form of the profile information is produced by a tool):

_dt_Q3_10xalanc_1_814VariablesStack10StackEntryFy
   (9046): 217536636
(VariablesStack.cpp)
Block Counters:
   610-647|217536636
   647-648|0
   648|217536636
Block coverage=66% (2/3)
Call Counters:
   610|217536636
   removeReference_Q2_10xalanc_1_827XalanReference
     CountedObjectFPQ2_10xalanc_1_8 27XalanReferenceCountedObject(567)
   648|0_dl_FPv(175)

On the first line of the above example a function named (_dt_Q3_10xalanc_1_814VariablesStack10StackEntryFv) is followed by a unique id for that function (9046), which is followed by a call counter (217536636) indicating the number of times this function is called during the training run. Following the call counter is the name of a source file in which this function is defined (VariablesStack.cpp). After that, a list of block counters (note: indicators such as 610-647 indicate a range of code blocks), is followed by a set of call counters for the functions that this function (9046) calls.

Processing proceeds to step S265, where PDF analysis module 315 performs an analysis on the profile-directed feedback information to produce analyzed information. The analysis includes aggregating data of the profile-directed feedback information to determine a maximum block count associated with one source file in the set of code portions. In this example, the analysis is to look at all the block and call counters associated with all the functions in each source file such as VariablesStack.cpp and find the maximum value. Further, VariablesStack.cpp may be mentioned several times in the PDF profile information, so the maximum block counter must be aggregated. The source files in the set of code portions is sorted in order of maximum block count. This means that the source files containing the hottest code come first in the sorted list, with the top 'n' percentage of those files being chosen for inclusion in a second phase of PDF optimization, where 'n' is a configurable number.

In some embodiments of the present invention, a processing is required for include files. Functions containing executable code may be defined in include files. The blocks of code contained in include files are listed in a PDF profile file generated during the training run, but may not not directly incorporated into a second phase PDF compilation, as they are only indirectly incorporated by virtue of being included in a first-class source file, such as a .C or .cpp file for C and/or C++ programming language. (herein, C and C++ source files having include files are referred to as first-class source files and the corresponding include files are referred to as second class files.) However files with hot code blocks should have their fat binary code available for a second phase or level PDF optimization. For that reason, any first class source file that includes an include file having hot code should be incorporated into a second phase PDF compilation. For example, in the case of C programming langue, if x.C includes y.h, and y.h has a function definition that has hot blocks, then x.C should be in a set of code chosen for a second phase PDF compilation, even if it would otherwise have been excluded. In some cases, y.h may have hot blocks, but those blocks are within a function that has a cold call in x.C. x.C should be considered hot, but if by call counters alone x.C would be missed even it includes code that is hot. Therefore, the "hotness" of y.h should be transferred to x.C. A method for such transfer would be to examine all the functions called in x.C, and find those functions that are defined in include files, and then transfer the maximum block counter of any such function to x.C. In some cases, however, a function included in include files may appear cold and yet has cold call to some other functions with hot blocks that may be in a different include file, thus, those calls need to be tracked down, and so on.

Some embodiments of the present invention provide an efficient and fast method to track down include file functions. Upon analyzing the training PDF profile, a data structure (herein referred to as Map_F) is created for functions defined in include files. The data structure maps each such function both to its maximum block counter as determined by immediate inspection, and a set of functions that it calls which are themselves defined in include files. This bookkeeping proceeds in linear time as the PDF profile file is scanned. For functions defined in first-class source files a separate data structure is used to record for each such source file, all the functions called in that source file. In the example above, the entry for VariablesStack.cpp would indicate it calls the following functions:

removeReference_Q2_10xalanc_1_827XalanReference CountedObjectFPQ2_10xalanc_1_8 27XalanReferenceCountedObject and_dl_FPv.

The call to _dl_FPv appears cold, but it may be discovered to be a hot function from an include file. Prior to generating results on maximum block counters, the transitively maximum block counter for each function in an include file is determined. Transitively maximum for a function means the maximum block counter for that function, or for any function it calls, transitively to the end of the call chain. Having made that calculation, the maximum block counter for each source file is compared to the transitively maximum block counter for all functions it calls, and the highest counter would be selected thereby possibly increasing the maximum block counter for that source file. In this way, the x.C would adopt the transitively maximum block counter of the function it calls in y.h, and therefore is considered hot enough to be included in a second phase PDF compilation. Because the source file is included, the code it incorporates from its included files would be available to the optimizer, and can be inlined, unrolled, and/or otherwise improved to make a resulting executable faster.

In some embodiments of the present invention, calculating the transitively maximum block counter quickly is to not directly chase down the call chains. Instead, the Map_F data structure is considered as a whole and a fixed point closure is performed on it. To do this the data structure is iterated, and scanned linearly function by function. At each stage the maximum block counter from called functions is pushed up to their callers. However, because a maximum operation is performed at each stage, the parent count may not change. When no change is made to any function maximum counter, a fixed point is found and closure is reached. In some embodiments of the present invention, the number of iterations to accomplish this is small in practice. For example, for a very large commercial application that is examined, there are over 40,000 functions spread over in excess of 1000 include files. Yet it takes only seven iterations to find the fixed point of all the include functions. The entire processing of the PDF profile data, including scanning the PDF file, building the data structures, computing the fixed point, and printing the results is accomplished in 1.5 seconds. This could subsequently reduce hours off a second phase compilation time.

Table 1 shows an example output from analysis of a PDF file information (also referred to as a profile analyzer).

TABLE 1

An example of output from a PDF profile analyzer.

| Filename | Max Block Count |
| --- | --- |
| XalanDOMString.cpp | 1819419228 |
| XalanReferenceCountedObject.cpp | 984655464 |
| XalanDOMStringCache.cpp | 637111310 |
| XalanBitmap.cpp | 571032136 |
| XalanQNameByValue.cpp | 319282070 |
| XPath.cpp | 296376110 |
| VariablesStack.cpp | 295840185 |
| XToken.cpp | 216017112 |
| XalanQNameByReference.cpp | 191498025 |
| XObject.cpp | 191139985 |
| XObjectFactoryDefault.cpp | 190604060 |
| XPathExecutionContextDefault.cpp | 176581236 |
| StylesheetExecutionContextDefault.cpp | 176581236 |
| XSLTEngineImpl.cpp | 140596741 |
| XalanNode.cpp | 129398175 |
| DoubleSupport.cpp | 104164275 |
| XalanOutputStream.cpp | 86270274 |
| ElemNumber.cpp | 86270274 |
| AttributeListImpl.cpp | 86270274 |

Figure 4:
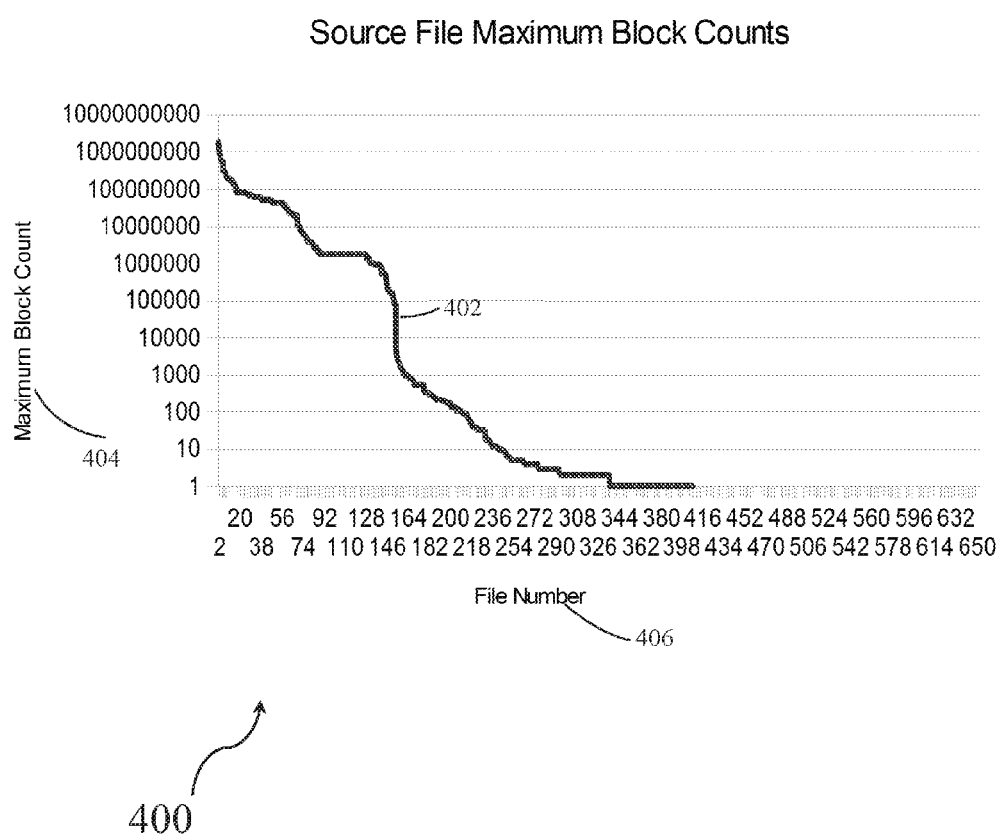
FIG. 4 depicts an example of a logarithmic chart showing the fall-off in block counters across all the source files according to an embodiment of the present invention.

In the above example, the maximum block counters of the various source files fall off very rapidly from the highest to the lowest, as shown in FIG. 4. FIG. 4 depicts logarithmic chart 400 showing fall-off line 402 for block counters 404 across all the source files 406. As can be seen from FIG. 4, about 10% of the source files have 97% of the block counts. Thus, compilation of a second phase could be sped up by 5 times, with no measurable impact on performance.

Processing proceeds to stop at step S270, where second phase compilation module 320 compile at a second level the set of code portions of the application to produce a second output using information including the first output and the analyzed information. In this example, by using the analysis results or analyzed information from step s265, only those source files with maximum block counters in the top 'x' percent of files have their fat binaries (intermediate forms) included in the second phase PDF whole program compilation (also referred to as a second level compilation). The value of 'x' can be adjusted by experiment or rule-of-thumb. A good first rule of thumb may be the top 10% of source files. In some applications examined, when using 11% of the source files, the second phase compile time is lowered by five times. In this example, the fat binaries included in the second phase compilation is from the first output of the first phase compilation. The second output produced from the second phase compilation includes executable intermediates generated by the second phase compilation. Further, the second output may include executable intermediates generated by the first phase compilation for which the corresponding intermediates forms (fat binaries) from the first phase compilation are not included in the second phase compilation, that is, for those fat binaries (produced in the first phase compilation) not included in the second phase compilation, their corresponding executable intermediates from the first phase compilation are reused and combined with the executable intermediates generated from the second phase compilation. A final executable application program may further be produced by linking both the executable intermediates from the first phase compilation and the executable intermediates from the second phase compilation.

In some embodiments of the present invention, an additional enhancement of optimization in the second phase compilation may further be achieved by using aliasing information that can be included from all the source files. In some compilers, the aliasing information is available in a separate section of each fat binary, and therefore can be quickly scanned and included in the whole program optimization phase, even for files where the intermediate form code itself is excluded. Even with such aliasing information included, the second phase compilation is still far faster than including and optimizing all the intermediate form code generated from the first phase, and would produce better optimization for the intermediate form code that is included.

An example of this is as follows: suppose that a function X defined in a source file x.C has a call to a function Y, defined in a source file y.C. The function X is hot, or has hot portions, but the call to Y is cold, and Y itself has no other hot portions. Thus, the source file x.C would be included in the second phase compilation but y.C would not be included. Nonetheless, the aliasing analysis performed by the first phase compilation and included in the fat binaries may be useful in compiling file x.C. Specifically, the aliasing information for y.C may include important information about the function Y's use of its pointer arguments and return values, and about global data that Y does or does not access. For example, if Y returns a pointer value, the aliasing information may indicate that the return value does not alias with the arguments. For reference parameters, the aliasing information may indicate that the arguments are not "address-taken." These can be vital clues for code optimization of x.C, even though the call from X to Y may be cold. Lack of aliasing information for that call could wind up pessimizing some of the code in the hot portions of X. This is because while compiling X, the compilation optimizer would be examining reaching definitions, def-use and use-def chains, and/or live ranges, any of which could be impacted by the cold call. Thus, using aliasing information that is quickly accessible, while ignoring cold code, can give an approach to maximizing PDF-based optimization opportunities, while still greatly minimizing compilation time.

Some embodiments of the present invention may include one, or more, of the following features, characteristics and/or advantages: (i) the amount of compilation time for optimizing a program as a whole is greatly reduced; (ii) minimal or no impact on the performance of the compiled application program is introduced; (iii) as an additional enhancement of optimization, aliasing information is included from all the source files; and/or (iv) a special processing is required for included files.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
executing training executable code using training data, the training executable code being generated from code portions of an application program, the training executable code including a block counter and a call counter;
updating the block counter and the call counter during execution of the training executable code according to a number of times one code portion of the code portions is executed during a training run;
storing the updated block counter and the updated call counter as profile-directed feedback information associated with the training executable code;
performing an analysis on the profile-directed feedback information to produce analyzed information, at least by aggregating data of the profile-directed feedback information to determine a maximum block count associated with the one code portion; and compiling the code portions to produce compiled code output using information including the training executable code and the analyzed information, wherein the compiling includes:
  adding select intermediate code portions of the code portions having maximum block counts in a predetermined top percentage, the select intermediate code portions included in the training executable code when the training executable code is generated from the code portions; and
  substituting executable code in the training executable code for excluded intermediate code of the code portions, the excluded intermediate code being intermediate code not included in the training executable code when the training executable code is generated from the code portions.

2. The method of claim 1, further comprising:
producing intermediate code when compiling the code portions; and
generating executable binary code using the compiled code output;
wherein:
the compiled code output includes the intermediate code.

3. The method of claim 1, wherein the compiling the code portions includes analyzing aliasing information from source files in the code portions.

4. The method of claim 1, further comprising:
creating the training executable code by compiling the code portions, wherein the creating includes inserting the block counter and the call counter to count a number of times a single code portion of the code portions is executed during execution of the training executable code.

5. The method of claim 4, wherein the training executable code includes intermediate codes in fat binaries produced during compiling the code portions to create the training executable code.

6. The method of claim 1, wherein performing the analysis further includes matching one code block of the code portions with a block counter generated during the training run.

7. The method of claim 1, wherein the predetermined top percentage is a configurable value.

8. The method of claim 1, wherein the compiled code output includes intermediate codes in fat binaries produced during the compiling.

9. A computer program product comprising a computer readable storage medium having stored thereon:
  first program instructions programmed to execute training executable code using training data, the training executable code being generated from code portions of an application program, the training executable code including a block counter and a call counter;
  second program instructions programmed to update the block counter and the call counter during execution of the training executable code according to a number of times one code portion of the code portions is executed during a training run;
  third program instructions programmed to store the updated block counter and the updated call counter as profile-directed feedback information associated with the training executable code;
  fourth program instructions programmed to perform an analysis on the profile-directed feedback information to produce analyzed information, at least by aggregating data of the profile-directed feedback information to determine a maximum block count associated with the one code portion; and
  fifth program instructions programmed to compile the code portions to produce compiled code output using information including the training executable code and the analyzed information, the fifth program instructions including:
    program instructions programmed to add select intermediate code portions of the code portions having maximum block counts in a predetermined top percentage, the select intermediate code portions included in the training executable code when the training executable code is generated from the code portions; and
    program instructions programmed to substitute executable code in the training executable code for excluded intermediate code of the code portions, the excluded intermediate code being intermediate code not included in the training executable code when the training executable code is generated from the code portions.

10. The computer program product of claim 9, further comprising:
sixth program instructions programmed to produce intermediate code when compiling the code portions; and
seventh program instructions programmed to generate executable binary code using the compiled code output;
wherein:
the compiled code output includes the intermediate codes.

11. The computer program product of claim 9, wherein the compiling the code portions includes analyzing aliasing information from source files in the code portions.

12. The computer program product of claim 9, further comprising:
sixth program instructions programmed to create the training executable code by compiling the code portions, wherein the creating includes inserting the block counter and the call counter to count a number of times a single code portion of the code portions is executed during execution of the training executable code.

13. The computer program product of claim 9, wherein the training executable code includes intermediate codes in fat binaries produced during compiling the code portions to create the training executable code.

14. The computer program product of claim 9, wherein the fourth program instructions include:
program instructions programmed to match one code block of the set of code portions with a block counter generated during the training run.

15. The computer program product of claim 9, wherein the compiled code output includes intermediate codes in fat binaries produced during the compiling.

16. A computer system comprising:
a processor set; and
a computer readable storage medium; wherein:
the processor set is structured, located, connected, and/or programmed to run program instructions stored on the computer readable storage medium; and
the program instructions include:
first program instructions programmed to execute training executable code using training data, the training executable code being generated from code portions of an application program, the training executable code including a block counter and a call counter;
second program instructions programmed to update the block counter and the call counter during execution of the training executable code according to a number of times one code portion of the code portions is executed during a training run;
third program instructions programmed to store the updated block counter and the updated call counter as profile-directed feedback information associated with the training executable code;
fourth program instructions programmed to perform an analysis on the profile-directed feedback information to produce analyzed information, at least by aggregating data of the profile-directed feedback information to determine a maximum block count associated with the one code portion; and
fifth program instructions programmed to compile the code portions to produce compiled code output using information including the training executable code and the analyzed information, the fifth program instructions including:
 program instructions programmed to add select intermediate code portions of the code portions having maximum block counts in a predetermined top percentage, the select intermediate code portions included in the training executable code when the training executable code is generated from the code portions; and
 program instructions programmed to substitute executable code in the training executable code for excluded intermediate code of the code portions, the excluded intermediate code being intermediate code not included in the training executable code when the training executable code is generated from the code portions.

17. The computer system of claim 16, further comprising:
sixth program instructions programmed to produce intermediate code when compiling the code portions; and
seventh program instructions programmed to generate executable binary code using the compiled code output;
wherein:
the compiled code output includes the intermediate codes.

18. The computer system of claim 16, wherein the compiling the code portions includes analyzing aliasing information from source files in the code portions.

19. The computer system of claim 16, further comprising:
sixth program instructions programmed to create the training executable code by compiling the code portions, wherein the creating includes inserting the block counter and the call counter to count a number of times a single code portion of the code portions is executed during execution of the training executable code.

20. The computer program product of claim 16, wherein the fourth program instructions include:
program instructions programmed to match one code block of the set of code portions with a block counter generated during the training run.

* * * * *